(12) United States Patent
Paik et al.

(10) Patent No.: US 11,619,284 B2
(45) Date of Patent: Apr. 4, 2023

(54) STRING STOPPER

(71) Applicant: WOOJIN PLASTIC Co., Ltd., Namyangju-si (KR)

(72) Inventors: Ji Sook Paik, Seoul (KR); Nan Hee Paik, Seoul (KR); Ji Hye Paik, Seoul (KR); Ji Won Son, Seoul (KR)

(73) Assignee: WOOJIN PLASTIC Co., Ltd., Namyangju-si (KR)

( * ) Notice: Subject to any disclaimer, the term of this patent is extended or adjusted under 35 U.S.C. 154(b) by 0 days.

(21) Appl. No.: 17/540,809

(22) Filed: Dec. 2, 2021

(65) Prior Publication Data
US 2022/0205514 A1    Jun. 30, 2022

(30) Foreign Application Priority Data
Dec. 29, 2020    (KR) .......................... 10-2020-0185701

(51) Int. Cl.
*F16G 11/14*    (2006.01)
*E04H 15/32*    (2006.01)

(52) U.S. Cl.
CPC ............. *F16G 11/14* (2013.01); *E04H 15/32* (2013.01)

(58) Field of Classification Search
CPC .. Y10T 24/3918; Y10T 24/3913; F16G 11/14; E04H 15/32
See application file for complete search history.

(56) References Cited

U.S. PATENT DOCUMENTS

| | | | | |
|---|---|---|---|---|
| 1,422,804 A | * | 7/1922 | Witte | F16G 11/14 24/129 R |
| 1,652,351 A | * | 12/1927 | Dyer | E04H 15/322 24/129 R |
| 3,988,810 A | * | 11/1976 | Emery | F16G 11/103 24/130 |
| 4,222,157 A | * | 9/1980 | Forman | F16G 11/103 24/129 A |
| 6,279,205 B1 | * | 8/2001 | Steiner | F16G 11/046 24/130 |
| 10,455,841 B2 | * | 10/2019 | Heurman | F16G 11/14 |

FOREIGN PATENT DOCUMENTS

| | | |
|---|---|---|
| JP | 2005-021302 A | 1/2005 |
| JP | 2006-132165 A | 5/2006 |
| KR | 20-0175248 Y1 | 3/2000 |

(Continued)

OTHER PUBLICATIONS

Extended European Search Report for related EP application No. 21215321.7 dated May 13, 2022 from European Patent Office.

(Continued)

*Primary Examiner* — Robert Sandy
(74) *Attorney, Agent, or Firm* — Paratus Law Group, PLLC

(57) ABSTRACT

A string stopper includes a fixing hole formed at an end, and a guide hole formed at one side of the fixing hole. A string is inserted into the fixing hole so that a fixed end of the string is fixed to the fixing hole, and a free end of the string is inserted into an entrance of the guide hole and is drawn out of an exit of the guide hole. The guide hole has a first narrow groove and a second narrow groove which are respectively formed at the inside of the entrance and at the outside of the exit of the guide hole.

8 Claims, 11 Drawing Sheets

(56) References Cited

FOREIGN PATENT DOCUMENTS

| KR | 10-2002-0090114 A | 11/2002 |
| KR | 10-2015-0145150 A | 12/2015 |
| NL | 7103864 A | 9/1971 |
| WO | WO 97/38243 A1 | 10/1997 |

OTHER PUBLICATIONS

Korean Office Action for related KR Application No. 10-2020-0185701 dated Aug. 23, 2022 from Korean Intellectual Property Office.
NAVER blog review, ZEROGRAM, Website: https://blog.naver.com/peak113/110179697353, Nov. 15, 2013, pp. 1-8 (see Concise Explanation of Relevance).

* cited by examiner

STRING STOPPER

CROSS-REFERENCE TO RELATED APPLICATION

This application claims priority to Korean Patent Application No. 10-2020-0185701 (filed on Dec. 29, 2020), which is hereby incorporated by reference in its entirety.

BACKGROUND

The present invention relates to a string stopper, and more particularly, to a string stopper which allows a user to easily connect and fix a string used for a tarp or a tent and to exactly and conveniently manipulate it in a fixed state as the user intended.

A tent or a tarp is a screen for blocking snow or rain and for protecting from sunlight, and strings and poles are used in order to form a predetermined frame by fixing the tent or the tarp on the ground stably.

That is, a string connects an edge or a pole of a tent to a fixing pack of the ground, a stopper which is mounted in the middle of the string adjust and maintain tension.

The stopper used generally has a rectangular plate made of metal or synthetic resin and is a bar-shaped stopper having holes formed at both ends. A string passes through the holes of both ends of the bar-shaped stopper in turn. When a user pulls the string tightly, the string is pulled in the orthogonal direction from the holes of the stopper to maintain the fixed state. In the above state, when the user tilts the stopper to adjust directions of the string and the holes, the stopper can move. So, the user can adjust tension by moving the stopper properly.

However, such a conventional bar-shaped stopper has several disadvantages in that it slips easily and cannot maintain tension well since a contact area between the string and the stopper holes is small, and in that tension gets loose easily even by a simple contact with the outside.

The patent literature 1 has been devised in order to solve the disadvantages of the conventional bar-shaped stopper. The patent literature 1 discloses a rope stopper for a tent or a tarp, which can adjust and fix the length of a rope of the tent or the tarp. The rope stopper includes: a stopper body made of a hard material of a bar shape with a predetermined thickness; a rope seating groove curved inwardly over the whole length of both sides of the stopper body so that the rope gets in contact with the rope seating groove; and rope insertion holes formed at upper and lower portions of the stopper body so that the rope is inserted into the holes. The stopper disclosed in the patent literature 1 is also a bar-shaped stopper, but is curved at both sides so that the rope can be put on the curved sides.

Therefore, the patent literature 1 and the conventional bar-shaped stopper have several problems in that tension gets loose even by external slight contact since it is difficult to firmly hold the string due to the simple holes through which the string is inserted, and in that the string may be damaged easily at the rims of the holes which play a crucial role in maintaining tension.

PATENT LITERATURE

Patent Documents

Patent Document 1: Korean Patent Publication No. 10-2015-0145150 (Dec. 29, 2015)

SUMMARY

Accordingly, the present invention has been made to solve the above-mentioned problems occurring in the prior arts, and it is an object of the present invention to provide a string stopper which can maintain tension stably by firmly supporting a string used for a tarp or a tent.

It is another object of the present invention to provide a string stopper which has a simple structure and is small in volume, thereby reducing a manufacturing cost.

It is a further object of the present invention to provide a string stopper which does not loosen tension easily by external slight contact and is easily adjusted by a simple manipulation after being mounted on the string.

To accomplish the above object, according to the present invention, there is provided a string stopper including: a fixing hole formed at an end; and a guide hole formed at one side of the fixing hole, wherein a string is inserted into the fixing hole so that a fixed end of the string is fixed to the fixing hole, and a free end of the string is inserted into an entrance of the guide hole and is drawn out of an exit of the guide hole, and the guide hole has a first narrow groove and a second narrow groove which are respectively formed at the inside of the entrance and at the outside of the exit of the guide hole.

Preferably, the guide hole is longer than the fixing hole. Moreover, the fixing hole and the guide hole are formed side by side in the same direction, and the string is inserted into the fixing hole and the guide hole in the same direction.

Moreover, the guide hole and the fixing hole are formed side by side to be adjacent to each other so as to reduce the entire volume.

Furthermore, a seating recess is formed at an entrance of the fixing hole into which the string is inserted, and is larger than a diameter of the fixing hole so that a knot formed at the fixed end of the string is seated on the seating recess.

Additionally, the first narrow groove and the second narrow groove are V-shaped grooves.

In addition, the fixing hole has a support groove formed at the outer face of the exit thereof so that the string is smoothly guided.

Moreover, the stopper has a first point formed at the outer face of the exit of the fixing hole, a second point formed at the part where the first narrow groove of the guide hole is formed, and a third point formed at the part where the second narrow groove of the guide hole is formed, and the first to third points are parts pressed by the curve of the string and form a triangle, so that the stopper can maintain proper balance when the string is pulled tightly.

Furthermore, a slope part is formed from the entrance of the guide hole to the entrance of the fixing hole, and the slope part has edge portions formed at both outer lateral sides to protrude along borders of the outer lateral sides so that a user can easily manipulate the string with the fingers.

The string stopper according to an embodiment of the present invention can reduce the entire volume and reduce a manufacturing cost since the fixing hole and the guide hole into which the string is inserted are formed adjacent to each other.

Additionally, the string stopper according to an embodiment of the present invention can firmly support the tightly pulled string by the narrow grooves and maintain tension stably since the narrow grooves are respectively formed at the entrance and the exit of the guide hole.

In addition, the string stopper according to an embodiment of the present invention does not loosen tension easily by slight contact and is easily adjusted by a simple manipulation so that the user can use it conveniently.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

Figure 1:
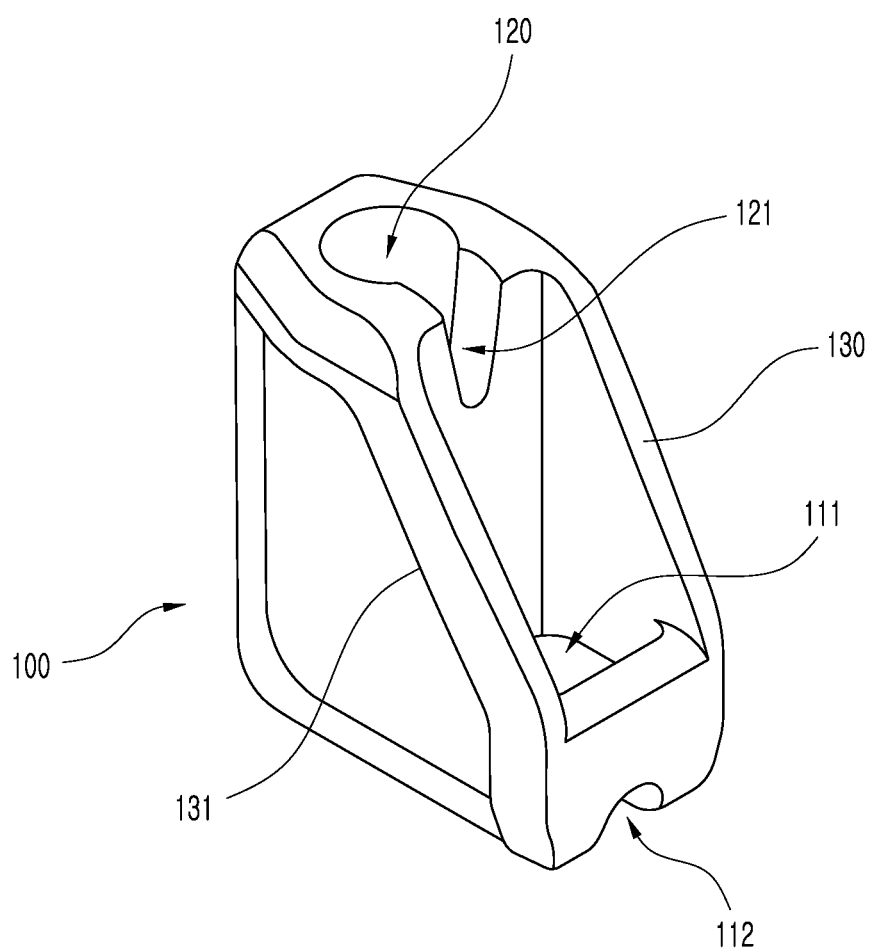
FIG. 1 is a perspective view illustrating an example of a stopper according to the present invention.
Figure 2:
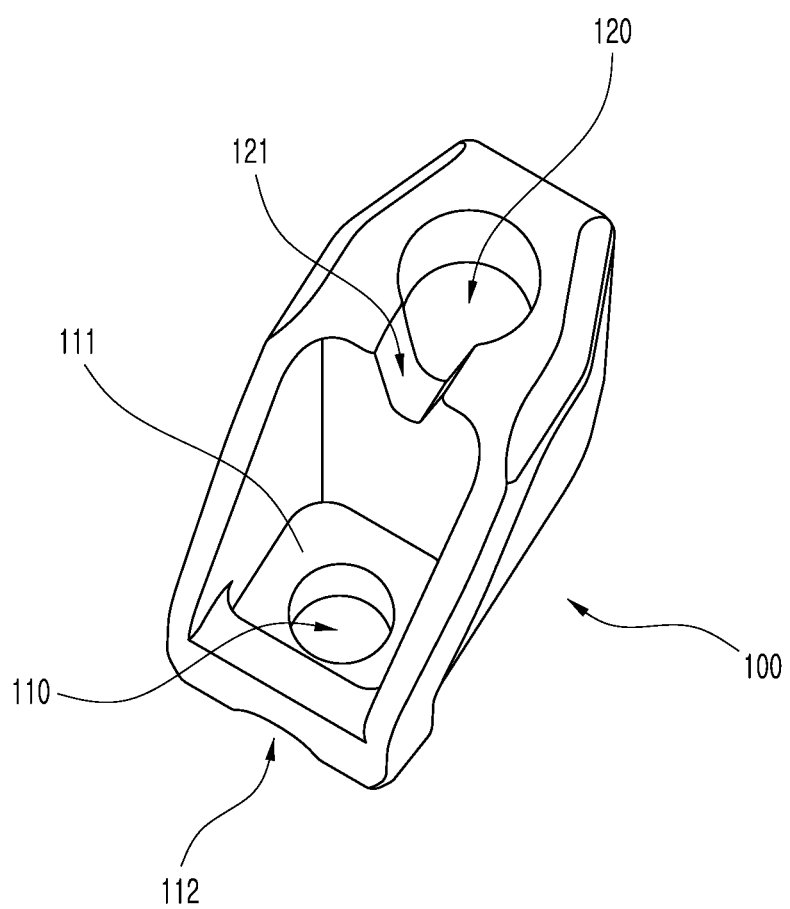
FIG. 2 is a perspective view of the stopper of FIG. 1 viewed from the top.
Figure 3:
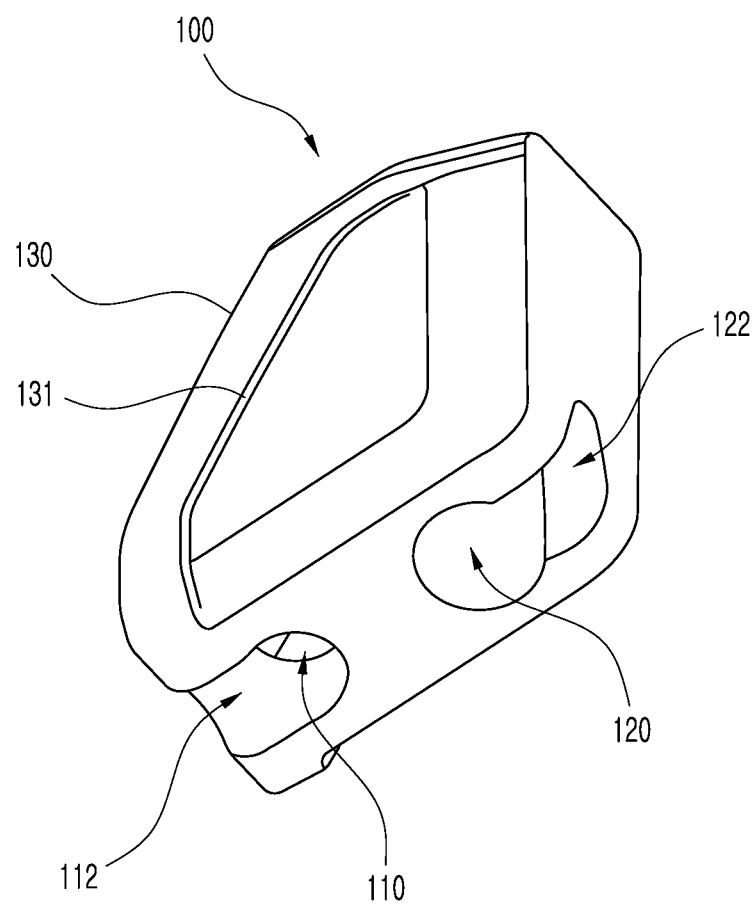
FIG. 3 is a bottom perspective view of the stopper according to the present invention.
Figure 4:
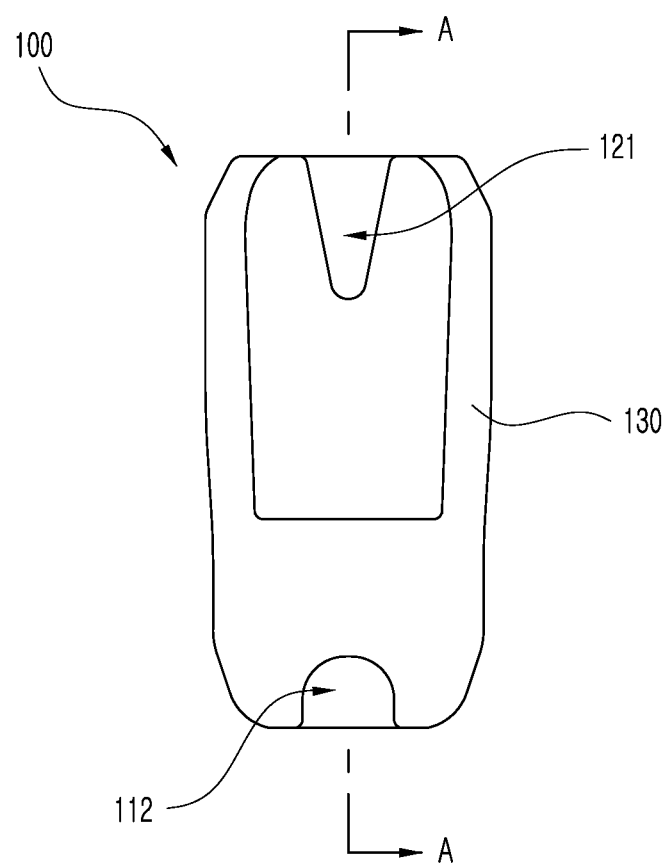
FIG. 4 is a right side view of FIG. 1.
Figure 5:
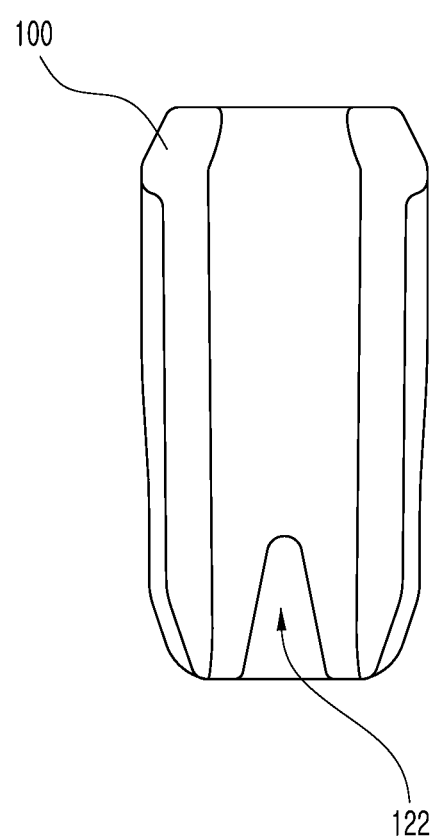
FIG. 5 is a left side view of FIG. 1.
Figure 6:
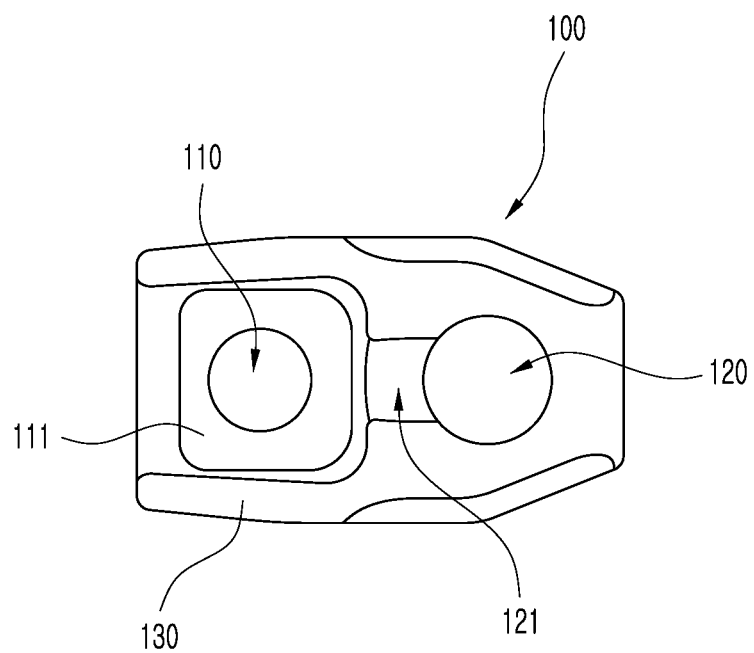
FIG. 6 is a plan view of FIG. 1.

An embodiment of the present invention will be described in detail with reference to the accompanying drawings. In the drawings, thicknesses of lines and sizes of constituent elements may be exaggerated for clarity and convenience in explanation.

In addition, the embodiment disclosed hereinafter does not limit the scope of the present invention, but corresponds to merely exemplary terms of constituent elements presented in claims of the present invention, and the embodiments that include replaceable constituent elements as equivalents of the constituent elements defined in the overall specification and claims may be included in the scope of the present invention.

FIGS. 1 to 7 illustrate a stopper 100 according to an embodiment of the present invention from many angles, in section.

The stopper 100 includes a fixing hole 110 and a guide hole 120 into which a string is inserted.

Preferably, the guide hole 120 is longer than the fixing hole 110, and the guide hole 120 and the fixing hole 110 are formed side by side to be adjacent to each other so as to reduce the entire volume.

Based on the direction that a string 200 is inserted, an entrance and an exit of the fixing hole 110 are respectively arranged in the same direction as those of the guide hole 120. Because exits of the fixing hole 110 and the guide hole 120 are formed on the same side and the fixing hole 110 is shorter than the guide hole 120, a slope part 130 is formed from the entrance of the guide hole 120 to the entrance of the fixing hole 110.

The slope part 130 has an inner space, and the inner space has a seating recess 111 on which a fixed end of the string 200 is positioned. The seating recess 111 is larger than a diameter of the fixing hole 110 so that a knot formed at the fixed end of the string 200 is seated on the seating recess 111.

The slope part 130 has edge portions 131 formed at both outer lateral sides to protrude along borders of the outer lateral sides, so that a user can easily manipulate the string with the fingers.

The fixing hole 110 has a support groove 112 formed at the outer face of the exit thereof to stably support the string 200.

The diameter of the entrance of the guide hole 120 is larger than the inner diameter of the guide hole 120 so that the string 200 can be inserted into the guide hole 120 smoothly. The guide hole 120 has a first narrow groove 121 and a second narrow groove 122 which are respectively formed at the inside of the entrance and at the outside of the exit of the guide hole 120 and are formed in a V-shape.

Figure 7:
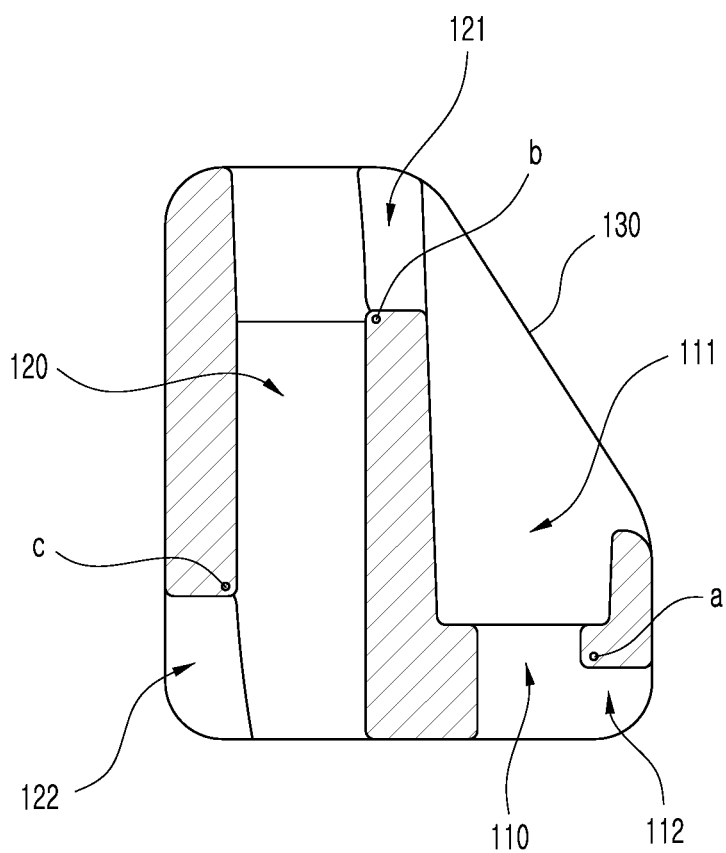
FIG. 7 is a sectional view taken along the line A-A of FIG. 4.

The stopper according to the embodiment of the present invention has three points on which pressure of the string is focused when the string is inserted into the stopper and is pulled. That is, as illustrated in FIG. 7, the stopper has a first point (a) at which the support groove 112 of the fixing hole 110 is located, a second point (b) formed at the inside of the entrance where the first narrow groove 121 of the guide hole 120 is located, and a third point (c) formed at the outside of the exit where the second narrow groove 122 of the guide hole 120 is located. The first to third points form a triangle to form a stable equilibrium.

Figure 8:
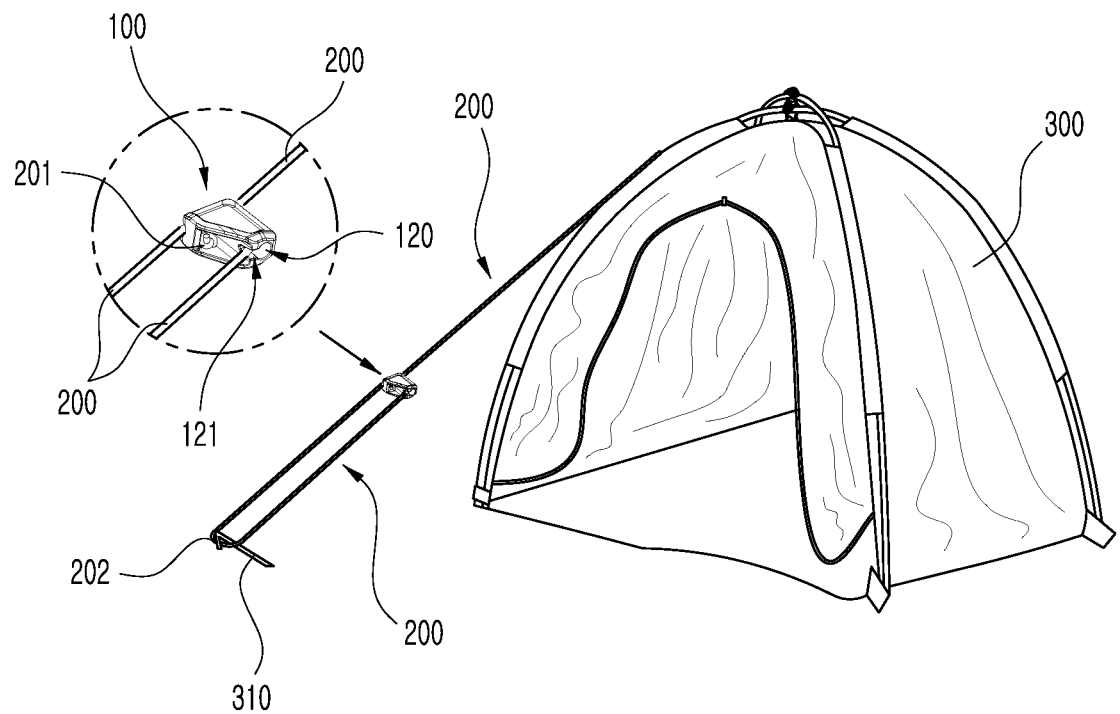
FIG. 8 is a view illustrating a used state of the stopper according to the present invention.

As illustrated in FIG. 8, the stopper 100 according to the embodiment of the present invention is used to fix and adjust the string 200 used for installing a tent 300.

One end of the string 200 is connected to the tent 200 and the other end of the string 200 is caught to a fixing pack 310 which is fixed on the ground, so that tension of the string 200 can be adjusted using the stopper 100 mounted in the middle of the string 200.

Figure 9:
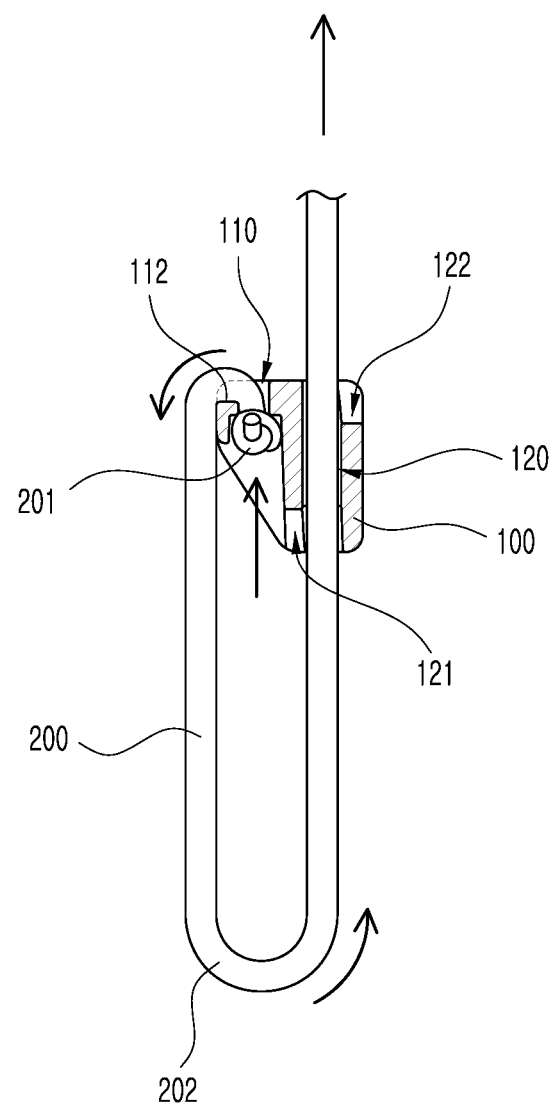
FIG. 9 is a sectional view illustrating a state where a string is inserted into the stopper.

FIG. 9 illustrates a state where the string 200 is inserted into the stopper 100. Referring to FIG. 9, a knot 201 is formed at one end, namely, the fixed end of the string 200, and is inserted into the entrance of the fixing hole 110 of the stopper 100. Then, the knot 201 is seated and fixed on the seating recess 111. When a free end of the string 200 is inserted into the entrance of the guide hole 120 and is drawn out through the exit of the guide hole 120, so, the string 200 is combined with the stopper 100. The string 200 passing through the fixing hole 110 turns around the support groove 112 and enters the guide hole 120 so as to form a ring part 202 between the support groove 112 and the guide hole 120.

Therefore, as illustrated in FIG. 8, the free end of the string 200 is connected and fixed to a ring of the tent, the ring part 202 is caught to the fixing pack 310, and then, the string 200 moves through the guide hole 120 of the stopper 100 to adjust the length of the string 200.

Figure 10:
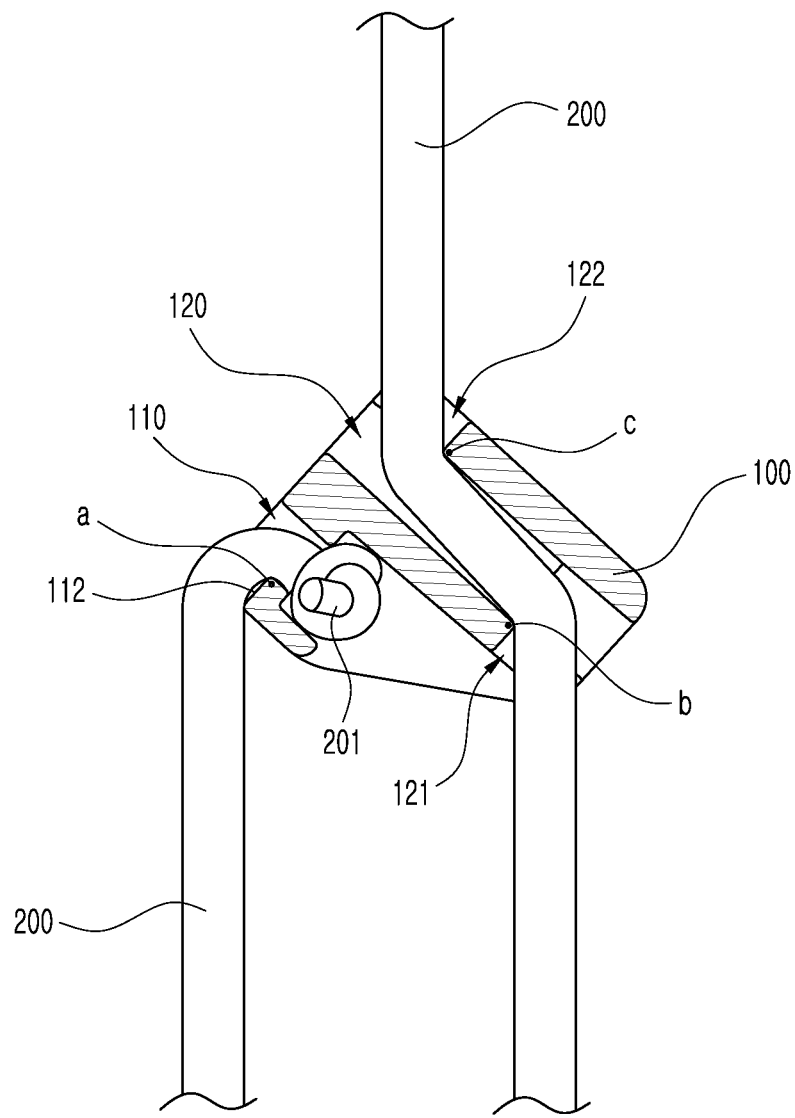
FIG. 10 is a sectional view illustrating a state where the stopper and the string are pulled tightly.

As described above, when both ends of the string 200 are connected and pulled tightly, as illustrated in FIG. 10, the stopper 100 is reclined.

That is, the string 200 is curved and pressed at the first point (a), the second point (b) and the third point (c) of the stopper 100 by power that pulls both end portions of the string 200, so that the string 200 can maintain the balance of power.

The curved portions of the fixed end of the string 200 press the first point (a) by being guided to the support groove 112, press the second point (b) located inside the first narrow groove 121 while passing through the first narrow groove 121 when entering the guide hole 120 after turning around the ring part 202, and then, press the third point (c) located outside the second narrow groove 122 while getting out the exit of the guide hole 120 and passing through the second narrow groove 122.

The curved portions of the string 200 press the three points forming a triangle in balance so that the string 200 can maintain the tightly pulled state as it is.

Moreover, the first narrow groove 121 and the second narrow groove 122 are formed in a V-shape. The string 200 is inserted into the first narrow groove 121 and the second narrow groove 122 of the guide hole 120 while being curved and pressed, so that tension of the string 200 does not get loose easily even by external contact since the narrow grooves 121 and 122 hold the string 200 firmly.

Figure 11:
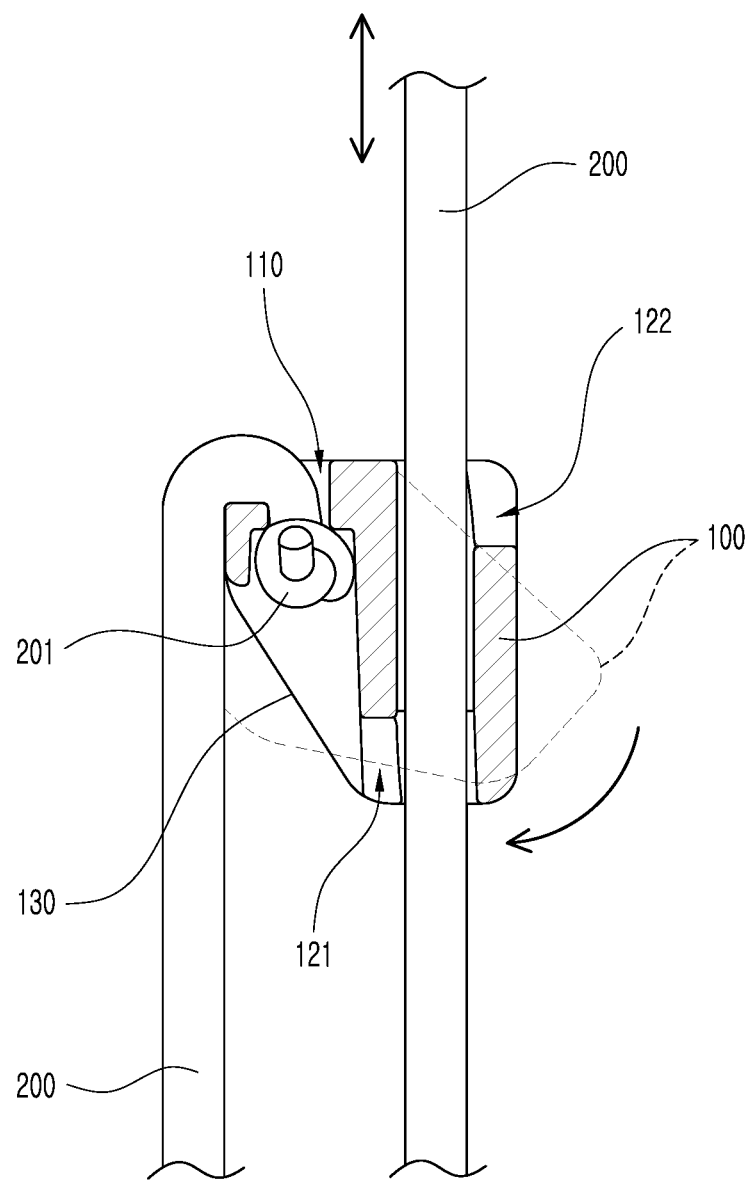
FIG. 11 is a sectional view illustrating a state where the stopper of the present invention moves on the string.

In the above state, in order to adjust tension or loosen the string, as illustrated in FIG. 11, when the user bends the stopper 100 back to adjust the directions of the guide hole 120 and the string 200, the pressed state of the string 200 and the stopper 100 is released so that the string 200 can freely move along the guide hole 120. When the user bends the stopper 100 in the opposite direction, the string 200 is curved and pressed at the three points again to be fixed.

In the state where the stopper 100 and the string 200 are fixed, in order to release the string 200 by bending the stopper 100 back, when the user downwardly pushes the slope part 130 located at the lower portion of the stopper 100, because the fixed end of the string 200 is fixed on the seating recess 111 by the knot 201, the second point (b) and the third point (c) rotate around the knot 201, so that the string 200 is released.

As described above, the fixed state of the string 200 can be released by the simple manipulation. Additionally, pushing the slope part 130 of the stopper 100, the user can accurately push and manipulate the stopper 100 without slip of the fingers since the edge portions 131 of the slope part 130 have stepped jaws.

While the exemplary embodiment of the present invention has been described in more detail with reference to the accompanying drawings, it will be understood by those of ordinary skill in the art that the present invention is not limited to the exemplary embodiment and may be implemented in various forms without deviating from the spirit or scope of the invention. For instance, the entire shape of the stopper, or sizes or arrangements of the fixing hole and the guide hole may be changed according to the user's selection or as occasion demands.

Furthermore, the stopper according to the embodiment of the present invention is applicable not only to strings used for a tent or a tarp but also to any object fit for the purposes of the present invention.

What is claimed is:

1. A string stopper comprising:
a fixing hole formed at an end; and
a guide hole formed at one side of the fixing hole,
wherein a string is inserted into the fixing hole so that a fixed end of the string is fixed to the fixing hole, and a free end of the string is inserted into an entrance of the guide hole and is drawn out of an exit of the guide hole, and
wherein the guide hole has a first narrow groove and a second narrow groove which are respectively formed at the inside of the entrance and at the outside of the exit of the guide hole,
wherein the fixing hole and the guide hole are formed side by side in the same direction, and the string is inserted into the fixing hole and the guide hole in the same direction.

2. The string stopper according to claim 1, wherein the guide hole is longer than the fixing hole.

3. The string stopper according to claim 1, wherein a seating recess is formed at an entrance of the fixing hole into which the string is inserted, and is larger than a diameter of the fixing hole so that a knot formed at the fixed end of the string is seated on the seating recess.

4. The string stopper according to claim 1, wherein the first narrow groove and the second narrow groove are V-shaped grooves.

5. The string stopper according to claim 1, wherein the fixing hole has a support groove formed at an outer face of an exit of the fixing hole.

6. The string stopper according to claim 1, wherein the stopper has a first point located at an outer face of an exit of the fixing hole, a second point located at a position where the first narrow groove of the guide hole is formed, and a third point located at a position where the second narrow groove of the guide hole is formed, and the first to third points are parts pressed by the curve of the string and form a triangle.

7. The string stopper according to claim 1, wherein a slope part is formed from the entrance of the guide hole to an entrance of the fixing hole.

8. A string stopper comprising:
a fixing hole formed at an end; and
a guide hole formed at one side of the fixing hole,
wherein a string is inserted into the fixing hole so that a fixed end of the string is fixed to the fixing hole, and a free end of the string is inserted into an entrance of the guide hole and is drawn out of an exit of the guide hole, and
wherein the guide hole has a first narrow groove and a second narrow groove which are respectively formed at the inside of the entrance and at the outside of the exit of the guide hole,
wherein a slope part is formed from the entrance of the guide hole to the entrance of the fixing hole,
wherein the slope part has edge portions formed at both outer lateral sides of the stopper to protrude along borders of the outer lateral sides, so that a user can easily manipulate the string with the fingers.

* * * * *